United States Patent [19]

Matsunaga et al.

[11] 4,238,057
[45] Dec. 9, 1980

[54] SIZING COMPOSITION OF SPRAYING TYPE

[75] Inventors: Kinjiro Matsunaga, Saitama; Masaki Tsumadori, Funabashi; Yunosuke Nakagawa, Soka, all of Japan

[73] Assignee: Kao Soap Co., Ltd., Tokyo, Japan

[21] Appl. No.: 29,061

[22] Filed: Apr. 11, 1979

[30] Foreign Application Priority Data

Apr. 19, 1978 [JP] Japan .................. 53/46266

[51] Int. Cl.$^3$ .................. B65B 31/00; D06M 13/16; D06M 13/18; D06M 15/20
[52] U.S. Cl. .................. 222/192; 8/115.6; 106/213
[58] Field of Search .............. 8/115.6; 222/195, 192; 106/213

[56] References Cited

U.S. PATENT DOCUMENTS

4,141,748  2/1979  Matsunaga et al. .................. 106/212

*Primary Examiner*—Joseph L. Schofer
*Assistant Examiner*—Herbert J. Lilling
*Attorney, Agent, or Firm*—Blanchard, Flynn, Thiel, Boutell & Tanis

[57] ABSTRACT

A sizing composition of the spraying type comprises from 2 to 10% by weight of a modified starch, of which a 4% aqueous solution has a viscosity of 5 to 30 centipoises at 20° C., and 0.3 to 7% by weight of dipropylene glycol. It is improved in respect to ironing properties.

9 Claims, No Drawings

SIZING COMPOSITION OF SPRAYING TYPE

The present invention relates to a spray type sizing composition having excellent ironing characteristics.

Sizing agents customarily used in ordinary households are divided into two types; a concentrate type sizing agent which is diluted with water to form a solution in which clothes are dipped for sizing, and a spray type sizing agent which is directly sprayed on clothes for sizing. The spray type sizing agents are further divided into an aerosol type sizing agent and a pump type sizing agent.

In the case of a concentrate type sizing agent, after a cloth is sufficiently impregnated with the sizing agent and dried, water is applied to the cloth by a sprayer and the cloth is ironed. No trouble is caused in ironing of a cloth treated with the concentrate type sizing agent, but it is known that the following disadvantages are caused when a cloth treated with a spray type sizing agent is ironed:

(1) An iron does not move smoothly at the ironing operation.
(2) A white residue of the sizing agent is formed by ironing.
(3) When a colored cloth is treated with the spray type sizing agent, there is caused a difference of the hue between the sprayed portion and the non-sprayed portion.

As means for improving the smoothness in the ironing operation, there has ordinarily been adopted a method in which an emulsion of silicone having a viscosity of 10,000 to 100,000 centistokes is used. However, when this emulsion is used in combination with a white residue preventing agent such as polyethylene glycol, propylene glycol or glycerol, its effect is reduced. Further, when this emulsion of silicone is used, the above-mentioned defect (3), that is, the poor finish, becomes conspicuous. Therefore, development of an improved spray type sizing agent has been desired in the art.

We made researches with a view to developing such an improved spray type sizing agent, and as a result, to our great surprise, it was found that when a modified starch of a low viscosity, a 5% by weight aqueous solution of which has a viscosity of 5 to 30 centipoises as measured at 20° C., is used as a polymeric substrate of a sizing agent and dipropylene glycol is used in combination with this starch, the foregoing defects involved in the conventional spray type sizing agents can be eliminated. Based on this finding, we have now completed the present invention.

As polymers for sizing agents, there have ordinarily been used modified starch, polyvinyl alcohol, carboxymethyl cellulose and the like. However, it was found that in the case of all of these polymers except the modified starch of a low viscosity of the present invention (the viscosity of its 5% aqueous solution is 5 to 30 centipoises as measured at 20° C.), white residues are left after ironing. As the modified starch of a low viscosity that is used in the present invention, there can be mentioned, for example, hydroxyalkylated starch and carboxyalkylated starch. Such modified starch is preferably prepared by reacting an alkali-starch slurry with an alkylene oxide having 2 to 4 carbon atoms or a halogenated (such as chlorine and bromine) carboxylic acid having 2 to 4 carbon atoms and treating the reaction product with an oxidant (such as hydrogen peroxide, sodium hypochlorite or the like) to reduce the viscosity. As the preferred modified starch, there can be mentioned a hydroxyalkylated starch having a hydroxyalkyl group having 2 to 3 carbon atoms. In the present invention, it is important that the viscosity of a 5% aqueous solution of the modified starch of a low viscosity should be 5 to 30 centipoises, preferably 8 to 15 centipoises, as measured at 20° C. If the viscosity is too low, a desirable hardness cannot be imparted to clothes. When the viscosity is too high, a good spray cannot be obtained. In the present invention, it is indispensable that the modified starch of a low viscosity should be incorporated in an amount of 2 to 10% by weight (all of "%" given hereinafter being by weight) in the spray type sizing composition.

Moreover, in the present invention, it is important the dipropylene glycol should be incorporated 0.3 to 7%, preferably 1.5 to 4%, in the spray type sizing composition. If the amount of dipropylene glycol is smaller than 0.3%, the effects of improving the smoothness in the ironing operation and preventing formation of white residues cannot be attained, and when the amount of dipropylene glycol is larger than 7%, the drying speed at the ironing operation is reduced or the stiffness of the sized cloth is decreased.

It is most preferred that the sizing composition of the present invention be used in the form of an aerosol type spray, and it is preferred that a liquefied petroleum gas such as propane or butane or fluorocarbon gas be used as a propellant.

It is usual that the weight ratio of the sizing composition to the propellant is in the range between 95:5 and 75:25.

In practising the present invention, the sizing composition comprising water as the solvent, the modified starch of a low viscosity and dipropylene glycol may further comprise, according to need, a water-soluble silicone, an emulsion of silicone having a viscosity of 10,000 to 100,000 centistokes, a surface active agent, a perfume, a fluorescent dye, a water soluble solvent, a fungicide and other additives so far as they are incorporated in amounts having no influences on the effects of the composition of the present invention.

The present invention will now be described in detail by reference to the following Examples that by no means limit the scope of the invention. In these Examples, all of "%" are by weight.

EXAMPLE 1

| Spray Type Sizing Composition: | |
|---|---|
| Polymeric compound as sizing agent (Table 1) | 5% |
| Dimethylsiloxane (10,000 centistokes) emulsion | 1% |
| Dipropylene glycol | 3% |
| Water | 91% |

An aerosol can was packed with 80 g of the above-mentioned spray type sizing agent composition, and a liquefied petroleum gas (having a pressure of 2.8 Kg/cm$^2$ at 20° C.) was filled in the can so that the weight ratio of the spray type sizing composition to the liquefied petroleum gas was 80/20.

This aerosol type sizing composition had such spray characteristics that the spray amount was 1.0 g/sec and the spray shape was circular (when the composition was sprayed at a point 15 cm apart from a cloth, the diameter of the spray circle on the cloth was about 8 cm).

The sizing composition was subjected to the white residue test, color staining test and ironing test to obtain results shown in Table 1.

These tests were carried out according to the following methods.

(A) White residue test

An aerosol type sizing agent was sprayed for 3 seconds to a black cotton broadcloth (count number=60) having a size of 90 cm×20 cm, and after the cloth had been allowed to stand still for 30 seconds, it was pressed by an iron (Model National NI-510AF, dial=cotton). Whether or not white residues of the sizing agent were left on the black cotton broadcloth was observed.
o: hardly observed
Δ: slightly observed
x: considerably observed

(B) Color staining test

An aerosol sizing agent was sprayed for 1 second on a blue cotton broadcloth (count number=60) having a size of 30 cm×20 cm from a point 5 cm apart therefrom, and after the cloth had been allowed to stand still for 30 seconds, the cloth was ironed and the state of color staining was examined.
o: hardly observed
Δ: slight stained
x: definite stained

(C) Ironing test

An aerosol sizing agent was sprayed for 3 seconds on a cotton broadcloth (count number=60) having a size of 30 cm×20 cm, and after the cloth had been allowed to stand still for 30 seconds, the cloth was pressed by an iron (Model Toshiba HIA-412, dial=cotton) and the smoothness in the ironing operation was examined.
o: good (standard)
Δ: poor
x: bad

TABLE 1

| Polymeric Compound for Sizing Agent | White Residue | Color Staining | Smoothness in Ironing Operation |
|---|---|---|---|
| Present invention | | | |
| hydroxypropylated starch (the degree of substitution = 0.16, viscosity of 5% aqueous solution = 10 centipoises) | o | o | o |
| Comparisons | | | |
| Polyvinyl alcohol (the degree of polymerization = 500, the degree of saponification = 89%) | Δ | Δ | Δ |
| carboxymethyl cellulose (the degree of substitution = 0.45, viscosity of 5% aqueous solution = 15 centipoises) | x | o | o |

EXAMPLE 2

A spray type sizing agent having a composition indicated below was filled in an aerosol can in the same manner as in Example 1, and the sizing agent was subjected to tests similar to the case of Example 1 to compare the effect of dipropylene glycol with the effect of analogous compounds. The obtained results are shown in Table 2.

| Composition of Spray Type Sizing Agent: | |
|---|---|
| Hydroxypropylated starch (the degree of substitution = 0.16, viscosity of 5% aqueous solution = 10 centipoises) | 5% |
| Dimethylsiloxane (60,000 centistokes) emulsion (effective ingredient content = 30%) | 0.5% |
| Solvent (Table 2) | 3% |
| Water | 91.5% |

TABLE 2

| Solvent | White Residue | Color Staining | Smoothness in Ironing Operation |
|---|---|---|---|
| Present Invention | | | |
| dipropylene glycol | o | o | o |
| Comparisons | | | |
| propylene glycol | x | o | o |
| polypropylene glycol 200 (molecular weight = 200) | Δ | x | Δ |
| polypropylene glycol 400 (molecular weight = 400) | o | x | x |
| ethylene glycol | x | Δ | o |
| diethylene glycol | x | o | o |
| triethylene glycol | x | Δ | Δ |
| polyethylene glycol 200 (molecular weight = 200) | Δ | x | Δ |
| polyethylene glycol 400 (molecular weight = 400) | o | x | x |
| glycerol | o | x | x |
| not added | x | o | o |

EXAMPLE 3

An aerosol can was filled with 85 parts by weight of a spray type sizing composition comprising 4% of carboxymethylated starch (the degree of substitution=0.10, viscosity of 5% aqueous solution=13 centipoises), 1.0% of an emulsion of dimethylpolysiloxane having a viscosity of 10,000 centistokes (effective ingredient content=45%), 0.5% of dipropylene glycol, 5% of ethyl alcohol and 0.5% of ammonium benzoate and 15 parts by weight of a liquefied petroleum gas (having a pressure of 3.1 Kg/cm$^2$ at 20° C.), and the resulting aerosol type sizing agent was tested in the same manner as described in Example 1. It was found that a satisfactory result was obtained at each test.

EXAMPLE 4

An aerosol can was filled with 85 parts by weight of a spray type sizing composition comprising 4% of hydroxyethylated starch (the degree of substitution=0.12, viscosity of 5% aqueous solution=9 centipoises), 0.5% of polyvinyl alcohol having the degree of polymerization of 500, 4% of dipropylene glycol, 0.2% of ammonium benzoate, 0.0001% of a fluorescent agent and 0.01% of a fungicide (Proxel XL manufactured by I.C.I. Ltd.) and 15 parts by weight of a liquefied petroleum gas (having a pressure of 3.1 Kg/cm$^2$ at 20° C.), and the aerosol type sizing agent was tested in the same manner as described in Example 1. It was found that a satisfactory result was obtained at each test.

The embodiments of the invention in which an exclusive property or priviledge is claimed are defined as follows:

1. A sizing composition of the spraying type consisting essentially of: from 2 to 10% by weight of a modified starch, said modified starch having the property that a 5% by weight aqueous solution of said modified starch has a viscosity of 5 to 30 centipoises measured at 20° C.; from 0.3 to 7% by weight of dipropylene glycol; and the balance is water.

2. A sizing composition as claimed in claim 1, in which said modified starch is selected from the group consisting of hydroxyalkylated ($C_2$–$C_4$) starch and carboxyalkylated ($C_2$–$C_4$) starch.

3. A sizing composition as claimed in claim 1 wherein said modified starch is a hydroxyalkylated starch in which the hydroxyalkyl group has 2 or 3 carbon atoms.

4. A sizing composition as claimed in claim 1 wherein the amount of said dipropylene glycol is from 1.5 to 4% by weight.

5. A sizing composition as claimed in claim 1 in which said viscosity is 8 to 15 centipoises.

6. A sizing composition as claimed in claim 1 which further contains water-soluble silicone or an emulsion of silicone.

7. A sizing composition as claimed in claim 6 which further contains a surfactant, perfume, fluorescent dye, water-soluble solvent, fungicide or a mixture thereof.

8. A spraying can containing 75 to 95% by weight of the sizing composition as claimed in claim 1 and 25 to 5% by weight of a propellant under pressure.

9. A method for sizing clothes which comprises spraying on the clothes an effective sizing amount of the sizing composition as claimed in claim 1.

* * * * *